US009209650B2

(12) United States Patent
Nita

(10) Patent No.: US 9,209,650 B2
(45) Date of Patent: Dec. 8, 2015

(54) SOLAR POWERED TABLETOP CHARGING STATION

(71) Applicant: Theresa Mary Nita, Parma, OH (US)

(72) Inventor: Theresa Mary Nita, Parma, OH (US)

(*) Notice: Subject to any disclaimer, the term of this patent is extended or adjusted under 35 U.S.C. 154(b) by 90 days.

(21) Appl. No.: 13/933,667

(22) Filed: Jul. 2, 2013

(65) Prior Publication Data
US 2014/0009103 A1  Jan. 9, 2014

Related U.S. Application Data

(60) Provisional application No. 61/667,726, filed on Jul. 3, 2012.

(51) Int. Cl.
H02J 7/00 (2006.01)
H02J 7/35 (2006.01)
H04M 1/04 (2006.01)

(52) U.S. Cl.
CPC . *H02J 7/355* (2013.01); *H04M 1/04* (2013.01)

(58) Field of Classification Search
CPC ....................................................... H02J 3/383
USPC ................................... 136/206, 244; 320/101
See application file for complete search history.

(56) References Cited

U.S. PATENT DOCUMENTS

| 6,017,188 | A  | * | 1/2000  | Benton ............................... 416/5 |
| 6,895,982 | B1 | * | 5/2005  | Shaw ............................... 135/16 |
| 7,614,600 | B1 | * | 11/2009 | Smith et al. .................... 248/519 |
| 8,104,491 | B2 |   | 1/2012  | Li |
| 2001/0054433 | A1 | * | 12/2001 | Patarra ............................ 135/16 |
| 2003/0134668 | A1 |   | 7/2003  | Mekuria |
| 2007/0283987 | A1 |   | 12/2007 | Reyes |
| 2009/0058354 | A1 | * | 3/2009  | Harrison ........................ 320/101 |
| 2010/0202627 | A1 |   | 8/2010  | Gray |
| 2010/0326849 | A1 |   | 12/2010 | Trimarche |
| 2011/0265694 | A1 |   | 11/2011 | Portis |
| 2011/0273133 | A1 |   | 11/2011 | Sala |

* cited by examiner

*Primary Examiner* — Paul Dinh
(74) *Attorney, Agent, or Firm* — Pearne & Gordon LLP

(57) ABSTRACT

The present invention relates to a table top, solar-powered charging/electricity providing to renewable devices having a shade structure for outdoor use. The invention having a base structure for stabilizing the device and for providing one or more compartments for storing items therein and/or providing a docking station or cellular phone charging station, a shade structure which contains one or more solar cells attached to an outer surface thereof, an attachment arm which connects the base and the shade structure, and various electronic components operative to convert solar energy into electricity.

24 Claims, 5 Drawing Sheets

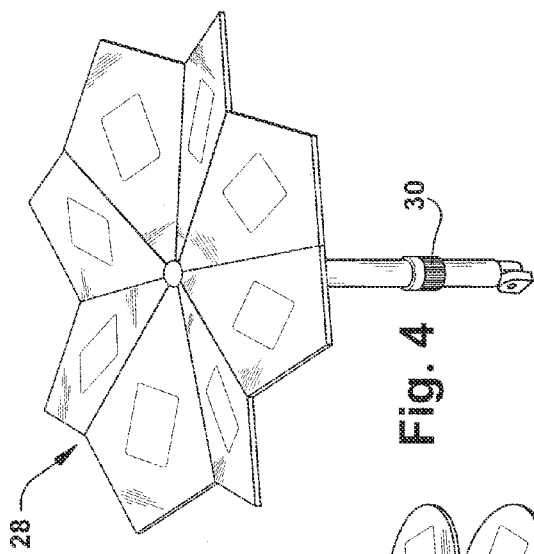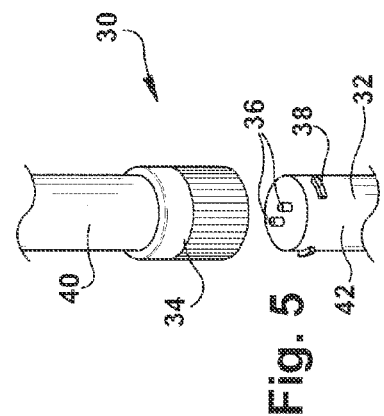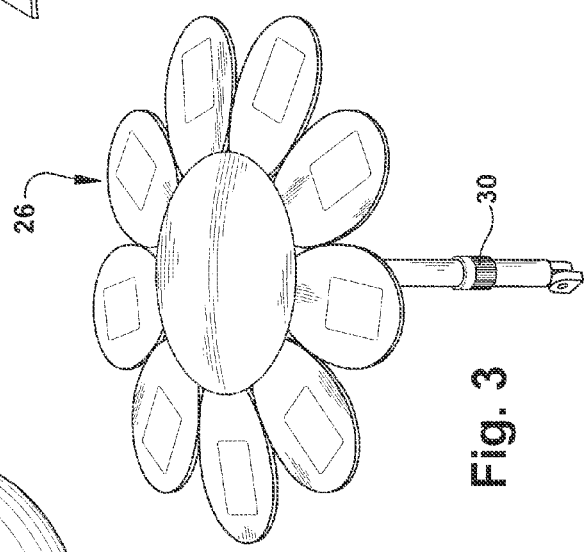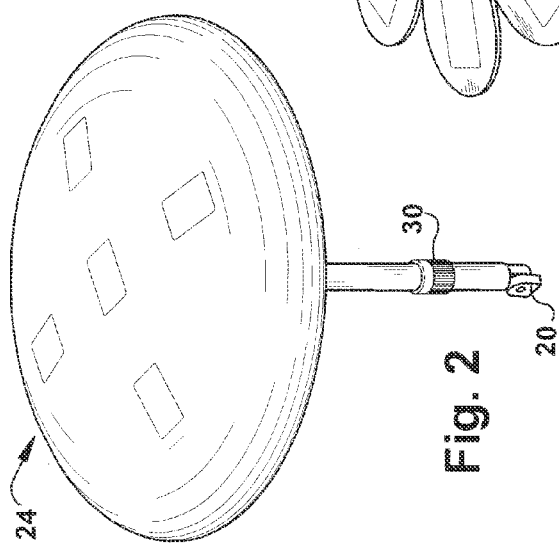

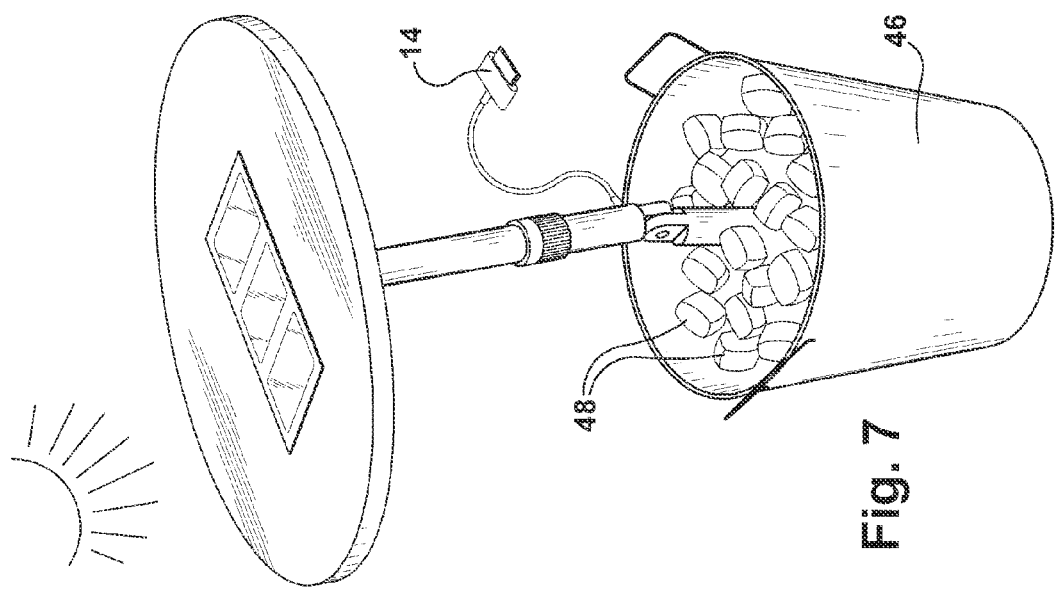
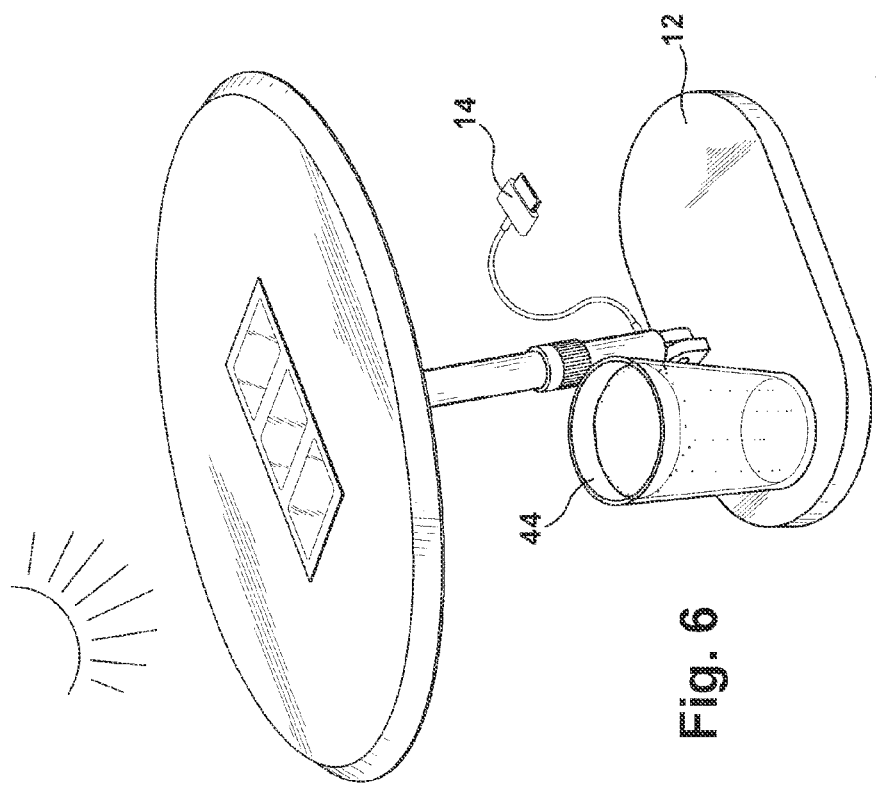

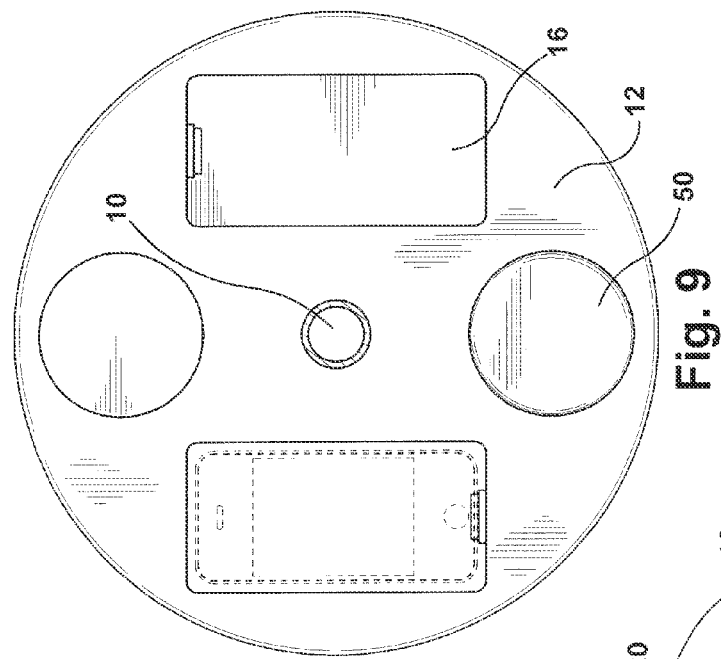
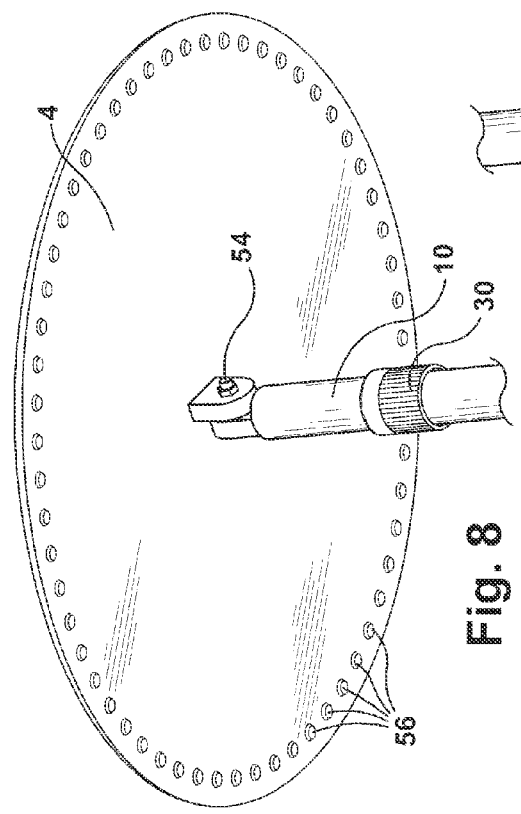
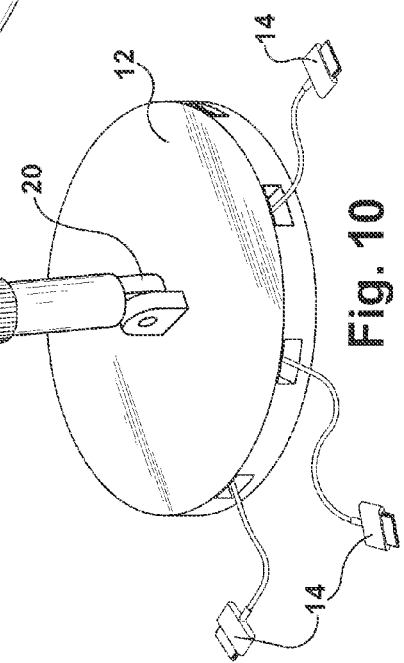

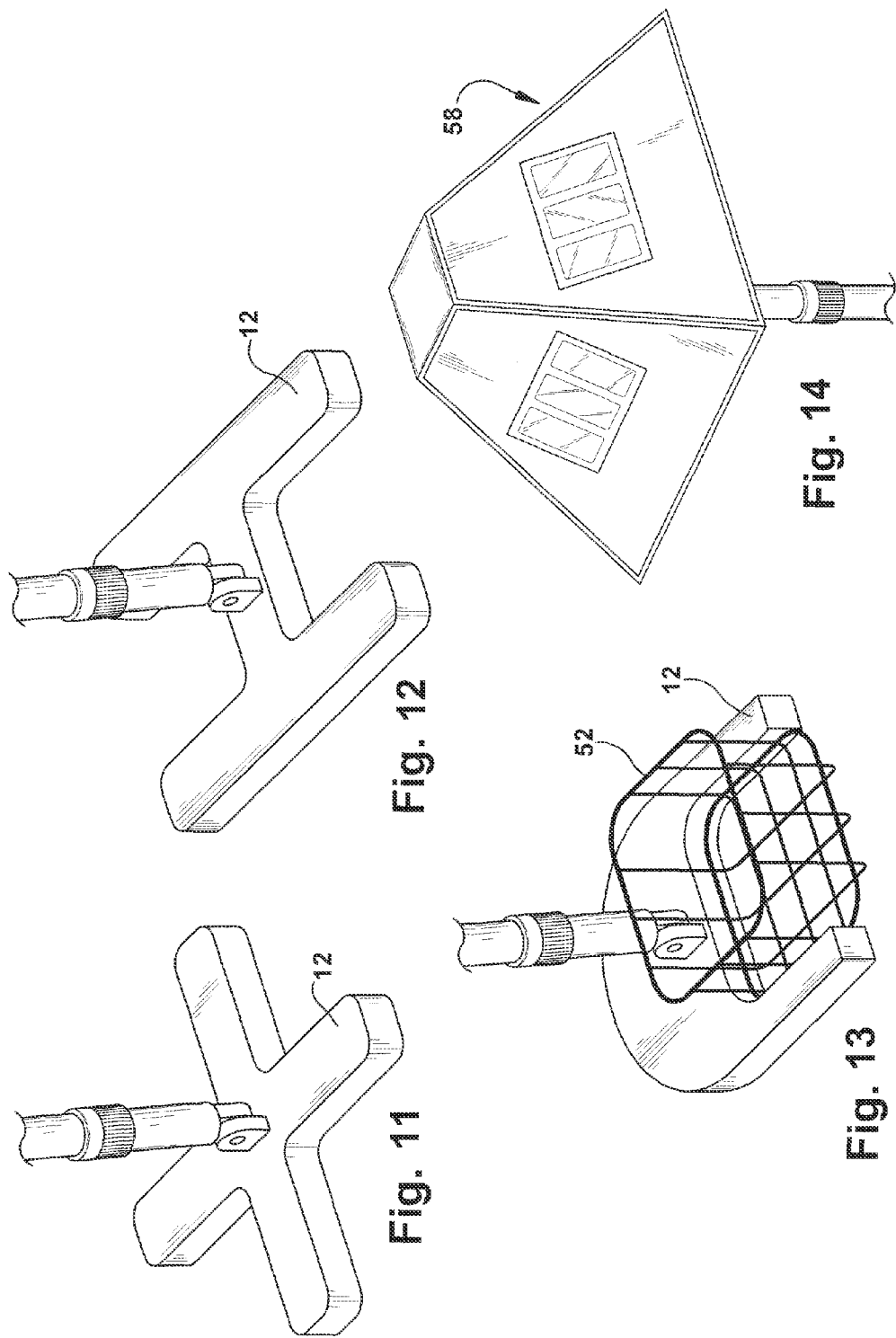

SOLAR POWERED TABLETOP CHARGING STATION

RELATED APPLICATION DATA

This application claims priority to and is a non-provisional of U.S. Provisional Patent Application No. 61/667,726, filed Jul. 3, 2012, entitled "Solar Powered Tabletop charging Station," the contents of which is incorporated by reference.

FIELD OF THE INVENTION

The present invention relates to a solar-powered charging/electricity providing device for use with renewable devices and having a shade structure for outdoor use.

BACKGROUND OF THE INVENTION

Beach umbrellas and larger table umbrellas have been known for years to provide protection from high temperature or sunlight. These umbrellas are larger in nature and provide shade for one or more persons on a patio, for use with a table or at the beach. Also known is the use of photovoltaic materials to recharge devices or to run items requiring an electrical source. The recent expansion in the use of portable phones and smart devices has increased the need for charging stations to be made more readily available in public settings such as at a resort, restaurant, café or bar. With prolonged use of the device(s) requiring multiple opportunities for recharging. The photovoltaic materials mentioned prior are added to the top of the umbrellas to utilize the available sunlight to provide electricity or recharge batteries/electronic devices. Such use of solar being environmentally friendly due to the renewable aspects solar technology provides. In addition, the price point for access to solar energy dropping as technology allows for greater power output from smaller solar cells at a lower cost per unit.

A larger umbrella device is disclosed in US2007/0283987. The drawback of such a large device is the bulkiness of the umbrella in that it is too large for a table top. In addition, such a device is limited only to the umbrella design and cannot utilize multiple apparatus for shade or solar collection. US2009/0058354 also discloses a large device for recharging portable devices, and potentially providing shade, but fails to adapt to various needs which could arise in the resort or restaurant industry such as day versus night use, the ability to be moved the device easily and the ability to advertise. U.S. Pat. No. 8,104,491 possesses the same drawbacks.

Another drawback of the larger umbrella units is that they may block too much sunlight. For example, at a beach or resort area maximum access to the sun is desired for one's own person. For example a person desires sun exposure to tan but the same exposure may not be desired for one's belongings or beverage/food items. In such a scenario, a person laying out or having a snack desires maximum sunlight but too often uses a beach chair or other items as a shading means for their beverage, food or various sundries. Typically this user desiring to have these items within arms reach but protected. Also said shading device could aid a user in reading a text message or otherwise using a portable electronic device.

What is needed in the art is a table top device which can be utilized in a variety of locations which provides shade to smaller items such as beverages, drinks, purses or condiments, and has solar cells integrated to provide charging capability to smaller handheld devices. Such a device can be quickly and easily transported from location to location, alternately incorporate advertising and possess adaptability to integrated multiple bases, shade tops and day versus night time use.

SUMMARY OF THE INVENTION

The present invention relates to a table top, solar-powered charging/electricity providing to renewable devices having a shade structure for outdoor use. The invention having a base structure for stabilizing the device and for providing one or more compartments for storing items therein and/or providing a docking station or cellular phone charging station, a shade structure which contains one or more solar cells attached to an outer surface thereof, an attachment arm which connects the base and the shade structure, and various electronic components operative to convert solar energy into electricity.

In one embodiment the present invention discloses a solar powered charging device comprising a shade structure having one or more solar cells contained on an outer surface thereof, a base for supporting charging device, an attachment arm which extends between the base and the shade structure, one or more power storage units connected to the one or more solar cells to store electrical energy, and one or more charging means connected to the one or more power storage units to charge one or more devices having a renewable battery.

In another embodiment the present invention discloses a solar powered charging device designed to fit on the top surface of a table comprising a shade structure having one or more solar cells contained on an outer surface thereof, a base for supporting charging device, an attachment arm which extends between the base and the shade structure and has a detachable coupling means to allow the interchange of shade structures or bases, one or more power storage units connected to the one or more solar cells to store electrical energy, and one or more charging means connected to the one or more power storage units to charge one or more devices having a renewable battery.

BRIEF DESCRIPTION OF THE DRAWINGS

FIG. 2 is a side view of the charging shade device providing an alternate embodiment for the top portion.

FIG. 3 is a side view of the charging shade device providing an alternate embodiment for the top portion.

FIG. 4 is a side view of the charging shade device providing an alternate embodiment for the top portion.

FIG. 5 is a side view of the detachable portion.

FIG. 6 is a side view of the solar powered tabletop charging shade device.

FIG. 7 is a side view of the solar powered charging shade device with an alternate embodiment for the base design.

FIG. 8 is a side view of the solar powered charging shade device detailing the underside of the top portion.

FIG. 9 is a top view of the solar powered charging shade device base detailing one embodiment for the base.

FIG. 10 is a side view of the solar powered tabletop charging shade device base detailing another embodiment for the base.

FIG. 11 is a side view of the solar powered charging shade device base detailing another embodiment for the base.

FIG. 12 is a side view of the solar powered charging shade device base detailing another embodiment for the base.

FIG. 13 is a side view of the solar powered tabletop charging shade device base detailing another embodiment for the base which includes a retaining device or container for additional objects.

FIG. 14 is a side view of the solar powered tabletop charging shade device providing an alternate embodiment for the top portion.

DETAILED DESCRIPTION

Figure 1:
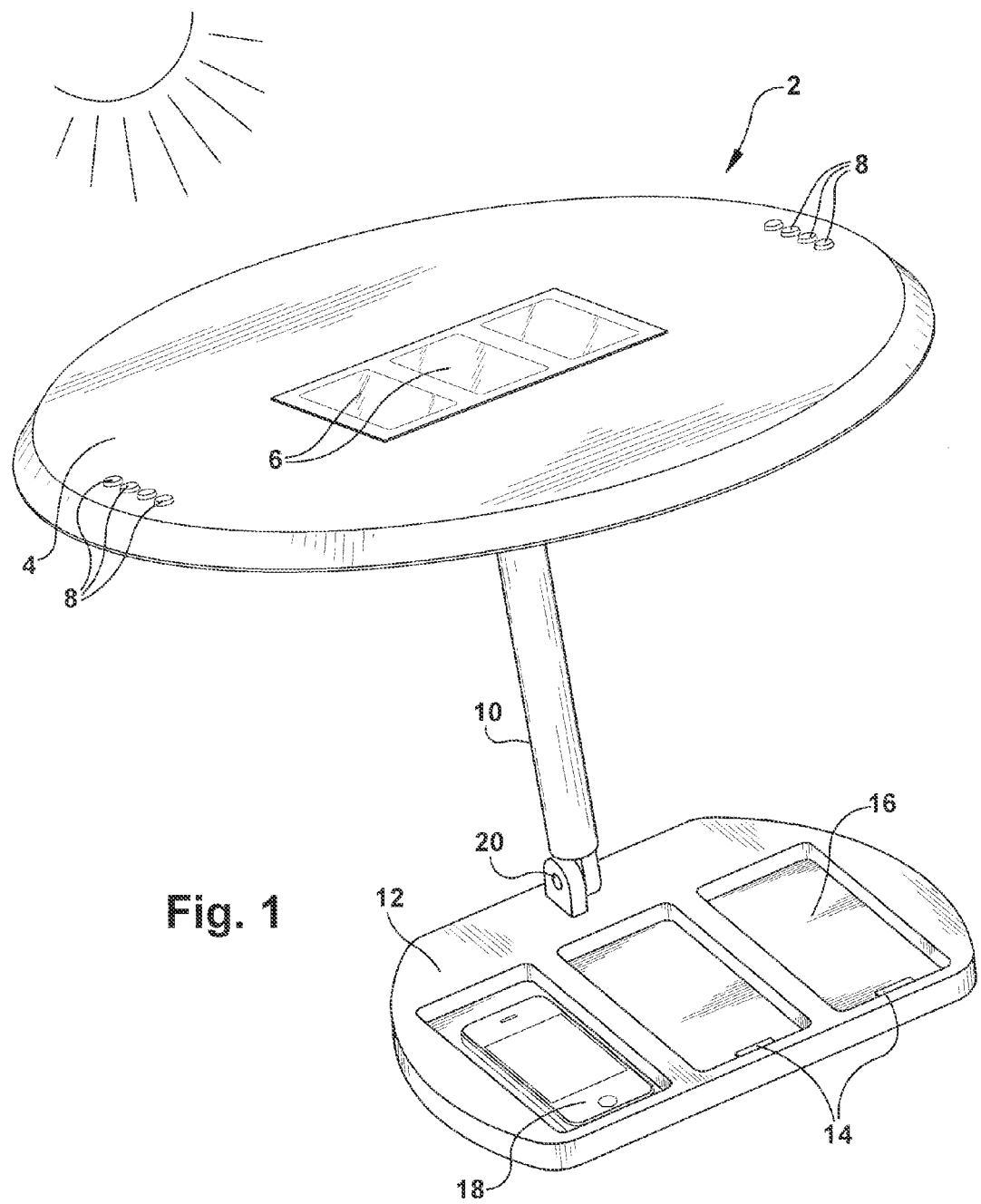
FIG. 1 is a side view of the solar powered charging shade device.

In one embodiment the present invention discloses a solar powered charging device comprising a shade structure having one or more solar cells contained on an outer surface thereof, a base for supporting charging device, an attachment arm which extends between the base and the shade structure, one or more power storage units connected to the one or more solar cells to store electrical energy, and one or more charging means connected to the one or more power storage units to charge one or more devices having a renewable battery.

In another embodiment the present invention discloses a solar powered charging device designed to fit on the top surface of a table comprising a shade structure having one or more solar cells contained on an outer surface thereof, a base for supporting charging device, an attachment arm which extends between the base and the shade structure and has a detachable coupling means to allow the interchange of shade structures or bases, one or more power storage units connected to the one or more solar cells to store electrical energy, and one or more charging means connected to the one or more power storage units to charge one or more devices having a renewable battery.

The present invention relates to a solar-powered charging/electricity providing to renewable devices having a shade structure for outdoor use and typically used on a table-top or area where a smaller type unit is preferred. The invention having a base structure for stabilizing the device and for providing one or more compartments for storing items therein and/or providing a docking station or cellular phone charging station, a shade structure which contains one or more solar cells attached to an outer surface thereof, an attachment arm which connects the base and the shade structure, and various electronic components operative to convert solar energy into electricity. The device is intended to be placed on a table or other raised flat surface, such as a restaurant table, or alternatively can be placed directly onto the ground or sand.

A solar cell (also solar module, solar panel, photovoltaic module or photovoltaic panel) is a packaged, connected assembly of photovoltaic cells. A solar cell (also called a photovoltaic cell) is an electrical device that converts the energy of light directly into electricity by the photovoltaic effect. The photovoltaic cells may be silicon based or made of other materials such as but not limited to indium gallium selenide or cadmium telluride, examples of which are marketed by First Solar, Global Solar Energy or Miasole. A power storage unit includes, but is not limited to, capacitor based storage devices, electrical double-layer capacitors, pseudocapacitors, electrochemical capacitors, supercapacitors, ultracapacitors, batteries, rechargeable batteries, (including those using lead-acid, nickel cadmium (NiCd), nickel metal hydride (NiMH), lithium ion (Li-ion), and lithium ion polymer (Li-ion polymer), renewable batteries, and electrochemical cells that convert stored chemical energy into electrical energy. An electrically powered device can be, but is not limited to, a cellular phone, smart phone, portable camera, video game, computer or music providing device.

FIG. 1 details solar powered charging device 2 from a side view as it would be typically utilized in sunlight on a table top. Top portion 4 being large enough to provide shade to one or more small items such beverage(s), condiments, or other similarly sized items or alternatively to provide shade to allow a user the ability to read text messages and acting as a shade structure. Top portion 4 also containing one or more solar cells 6 or other photovoltaic materials. Such solar cells being used to convert available sunlight into electricity for portable or handheld devices. The size and number of solar cells used depending on each individual application and taking into account available sunlight and the amount of power desired. Alternatively top portion containing one or more lighting means 8 for use in the evening/night/low light or as a means of advertising various products. In another embodiment, lighting means 8 may be replaced by a display means for advertising or as a means of conveying information such as, but not limited to, restaurant or drink menus. In yet another embodiment lighting means 8 illuminating a removable slide for marketing or informational purposes, for example one or more lights shining thru a removable slide advertising menu specials.

Top portion being connected to base 12 by arm 10. Arm 10 serving as a means of attaching top portion and base (Arm 10 not limited to a single arm but also including embodiments where multiple arms are utilized). Arm 10 also providing a means of transferring electric charge to one or more charging means 14 (or alternatively one or more power storage units) located in base 12. Base 12 of device 2 may contain a docking station 16 or may otherwise accommodate one or more cellular phones or other small electronic devices 18 via charging means 14, such as, but not limited to, a PDA, an iPod, a light source, cellular phone, smart phone, portable camera, video game, computer or music providing device. Base 12 also providing base attaching means 20 which allows arm 10 to attach to base. Base attaching means 20 allowing arm and top portion to be positioned so as to maximize sun exposure to the solar cells 6 and to provide protection to items shaded by top portion 4. Base attaching means 20 also being known as a point of articulation such as, but not limited to, a swivel, pivot or ball joint. In one embodiment device 2 being designed or optimized for use on a table top. In another embodiment device 2 being not more than 24 inches from bottom of base 12 to highest point of top portion 4 (i.e. from bottom of base to top of shade structure).

FIGS. 2, 3, 4 and 14 detail how top portion 4 may be one of multiple embodiments such as, but not limited to a dome 24, a decorative shade 26, 28, an umbrella, palm tree, sun screen, a lampshade 58 or any other type of shading device. Top portion optionally being able to be made into any design, provided solar cells can be attached and provide shade below. Top portion containing solar collecting outer surface such as solar cells 6 which collect and store energy from sunlight. Solar cells 6 may be attached to an outer surface of top portion or may be integrated into the fabric or material of top portion. Various fabrics and materials can be used. In one embodiment the fabrics and materials of top portion 4 being eco-friendly and/or utilizing renewable materials. Top portion 4, 24, 26, or 28 may have an configuration which covers or shades the base and perhaps the area around the base. This provides protection for any items, such as cell phones or beverages, which are contained on the base (or near the base) from damage caused by direct sunlight or glare associated with being able to effectively use the device due to sunlight. The shade structure may be manually or electronically moved to adjust to the rising or setting sun. The shade structure also preventing drinks (or food) which are contained in, on, or next to the base from warming if they were left in direct sunlight. In yet another embodiment, top portion 4 designed in a manner to maximize advertising space such as allowing leaflets or flyers to be inserted onto top portion or by utilizing skins displaying advertisements utilizing space not allotted to solar cells 6. In another embodiment the same advertising being backlit from one or more lights.

In one embodiment, top portion 4 may be removably attached to the arm 10 or base 12 so that the top portion is interchangeable with other shade structures or base 12 is interchangeable with other bases. Such alternative embodiments having a different configuration or arrangement which are made of a different material or having a different aesthetics or decorative effects. FIG. 5 providing detail regarding coupling device 30. Coupling device 30 allowing interchangeability between top portion 4 and base 12 in multiple configurations. In one embodiment, coupling device 30 allowing top portion 4 of unit to detach from base to allow for use of different top portions or bases or alternatively for storage of device. In essence, arm 10 becomes two portions, arm top 40 and arm bottom 42. In one embodiment of coupling device 30, male portion 32 interlocking with female portion 34. In another embodiment electrical transfer means 36 coupling to provide continuous flow of electricity or battery charge from solar cells 6 to charging means 14. In still yet another embodiment coupling device 30 containing one or more securing means 38. Securing means 38 attaching arm top 40 to arm bottom 42 via a locking device, a twisting device, a push button or any number of securing means available. In another embodiment, coupling device 30 allowing a user the ability to change themes or the overlook of the item as needed. For example, a restaurant could utilize dome 24 from FIG. 2 (with optional soccer ball skins or graphics) during a soccer tournament it is promoting or sponsoring, then change the next day to decorative shade 26 (such as a flower petal in FIG. 3) for a garden theme, all the while utilizing the same base 4. In another example, the same flexibility or options are provided to a user in the choice of multiple bases 4, i.e. using a beach theme base for stability on sand or uneven surfaces and a condiment related base for use on a table at a restaurant.

In another embodiment, arm 10 may contain one or more pivot joints for moving the top portion in different positions or orientations. Optionally arm 10 is hollow with a cavity therein for storage of electronic components required to convert solar energy into electricity and for various wires or other conductive units leading from a photovoltaic device to the outlet or charging device. In another embodiment base attaching means 20 includes an optional swivel or ball joint allowing for full rotation of arm 10 around its axis. In yet another embodiment attaching means 20, being a swivel, pivot joint, 360 degree swivel joint or any other means to allow freedom of movement of arm. In still yet another embodiment, arm 10 have extension capability to allow more or less space between top portion 4 and base 12 depending on the users needs. In yet another embodiment, arm 10 being made in a manner so that it is flexible and provides additional freedom of movement yet is able to stand upright/erect (for example using materials for arm similar to those utilized in flexible lighting systems).

Base 12, or alternatively top portion 4, contains and conceals the various electronic components and power storage units, such as but not limited to a transducer, backup batteries, backup power supplies, USB hubs, phone cord chargers, lights, and/or retraction devices for stray cords. A transducer being used to convert solar energy to electricity needed for powering or recharging the one or more cellular phones or other electrical devices. A backup battery compartment may also be located within base 12 or top portion 4 to provide electricity to the charging device when the solar energy is low.

In the event a device is attached, all power available is diverted to the device until it is at full charge, with the remaining power utilized to recharge the internal battery. In another embodiment a power storage unit wherein the one or more solar cells collect solar energy and the power storage unit converts the solar energy into electrical energy is located in top portion 4 and is connected to one or more charging means to charge one or more devices having a renewable battery. The power available being at least 0.1 watts. In another embodiment the power available being 2.5 watts. In still yet another embodiment the power available being at least 5 watts. In another embodiment the current available being at least 100 mA (0.1 amps). In yet another embodiment the current available being at least 500 mA (0.5 amps). In another embodiment the solar cells and power storage unit working together to maintain a constant voltage or appropriate voltage regulation wherein the system provides near constant voltage over a range of load conditions (this may also refer to a passive property that results in more or less voltage drop under various load conditions, or to the active intervention with devices for the specific purpose of adjusting voltage). In another embodiment, power storage unit being replaceable in the event power storage unit loses its ability to hold or deliver an effective charge.

Base 12 typically weighted to maintain stability of the structure and withstand wind or to prevent accidental damage. Base 12 may be made of injection molded plastic, metal or any other suitable material. Sand or water may be optionally used to fill base 12 to provide additional weight. In another embodiment base 12 and/or arm 10 bing made from renewable or recyclable materials.

In addition to housing electronics and providing a docking or charging station for one or more electronic devices, base 12 may employ various styles to accommodate individual user's needs. FIG. 6 details one embodiment where base 12 is flat allowing for a resting place for beverage 44. In this example, charging means is via a charging cord originating from arm 10 but could also originate from base 12. FIG. 7 details another embodiment where base is in the form of a container such as a bucket 46 containing ice 48. In this embodiment, charging means originates from arm 10 but could also be incorporated as needed into bucket 46.

FIG. 9 is a top view of one embodiment of base 12 providing docking station(s) 16 and holders 50 for cups, glasses or other suitable items. In another embodiment holders 50 can be exchanged for ashtrays. FIG. 10 is another embodiment of base 12 where the charging means 14 originate from the base. In this embodiment charging means 14 are secured via retractable cords which retract back to base 12 to protect charging means when not in use.

FIGS. 11 and 12 detail alternate embodiments of base 12 to provide a smaller footprint for the base. Such an embodiment could be utilized to minimize contact area and provide additional table top area for use. In another embodiment the top portion 4 aligned in a manner with base 12 so that the shade structure blocks the sun's rays from the base 12, such an embodiment maximizing the cooling aspects of shade. In one embodiment this alignment making a reading of the temperature of the air near the base at least 3 degrees (F.) cooler than the temperature of areas not shaded by top portion 4. FIG. 13 provides yet another embodiment of base 12 wherein a basket 52 is provided to hold items. For example basket 52 could hold items such as condiments at a restaurant, tanning lotion for use at a beach, cigarettes and smoking accessories or anything which would benefit from not being in direct sunlight. Basket 52 being any type of container including but not limited to open wire as shown in FIG. 13, a closed contained similar to bucket 46 or any variation thereof. In another embodiment basket 52 or holders 50 being insulated to provide additional protection to items contained therein. Base 12 may also contain one or more lights or other indicators which indicates that the solar charge is weak or running low. Base 12 may also include a light to indicate adequate sunlight available for charging. These embodiment are exemplary and the various features of the base designs can be interchanged as needed. For example, charging means 14 can be any number of apparatus including but not limited to a cord or a docking port and the charging means can be located or originating from either arm 10 or base 12.

FIG. 8 details one embodiment of the underside of top portion 4. Optionally a top attaching means 54 is secured to top portion 4. Top attaching means 54 connecting arm 10 to top portion 4. Top attaching means 54 being a swivel, ball joint, pivot joint, 360 degree swivel joint or any other means to allow freedom of movement for the top portion 4. In another embodiment lights 56 being located on the underside of top portion 4. Such lights being LED lights but possibly any means of providing visual assistance to the underside of top portion 4 such as, but not limited to, fluorescent lights or incandescent lights. In another embodiment, device 2 lighting means or lights contained on base 12 or on the underside of the top portion 4 for lighting a tabletop or the items contained on or within base 12. In another embodiment, device 2 lighting means or lights contained on arm 10. The lighting means or lights may be of any number, type or color and may be interchangeable. The invention may also optionally include one or more speakers for providing sound from one or more sound producing devices. Said speakers may include a blue tooth device for synching or could be attached via a standard headphone jack. The invention may optionally include a light sensitive means being located somewhere on device 2 to sense a low light situation (and thereby turning on or off lights 56 or other energy consuming devices). Light sensitive means thereby allowing conservation of the power used by lights 56 until low light setting arise such as evening or nighttime. In yet another embodiment top portion 4 containing back lighting for inclusion of a semi-transparent advertisement.

In one embodiment the materials used in the construction of device 2 being weather resistant as the invention is typically used outdoors. Table top device should be able to withstand prolonged periods in the sunlight and possible wind or rain. The device is intended to be portable and used outside, though optionally the device can be moved inside provided an adequate charge is given to the batteries. For example the device can charge all day at a restaurant's outdoor tables, then can be brought inside at night to be used as lighting sources. Optionally device 2 able to plug into a standard AC wall outlet (such a scenario could be necessary in the event of multiple days lacking adequate sunlight). The AC power supply being used to either charge the device itself or optionally to use the charging and lighting features. In another embodiment, one or more solar cells 6 being covered by a material or mesh to obscure their true nature as solar devices, provided the material or mesh allows a sufficient amount of sunlight to penetrate thru.

In another embodiment device 2 employing or incorporating an attaching means which attaches device 2 to another item For example, base 12, arm 10 or top portion 4 incorporates (or utilizes) an optional clamp allowing device to be attached to a chair, beach lounge chair or other such item. In yet another embodiment arm 10 including a shelf, basket, pouch or clamping device for storing addition items.

While the table top device of the present invention has been described in one embodiment as being used at a resort, in a restaurant or in the restaurant industry, the device may be adaptable to a variety of commercial, business or home uses such as, but not limited to, use in bars, taverns, on beaches, in a back yard, by a pool or at a picnic. Also, the various components of the device, while described in a particular location or orientation with regard to the other components, may be moved to other locations and have other orientations within the described device. Finally, although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

The invention claimed is:

1. A solar powered charging device for charging devices requiring an electrical source, said solar powered charging device comprising:
   a shade structure having one or more solar cells contained on an outer surface of the shade structure;
   a base for supporting the solar powered charging device;
   an attachment arm which extends between the base and the shade structure, said attachment arm having a detachable coupling device to allow interchange of shade structures or bases, wherein the detachable coupling device forms an electrical connection and comprises a male portion interlocking with a female portion;
   one or more power storage units connected to the one or more solar cells to store electrical energy; and
   one or more charging means connected to the one or more power storage units to charge one or more devices having a renewable battery.

2. The solar powered charging device of claim 1 wherein the solar powered charging device is designed to fit on the top surface of a table.

3. The solar powered charging device of claim 1 wherein a height of the solar powered charging device is less than 24 inches from a bottom of the base to a highest point of the shade structure.

4. The solar powered charging device of claim 1 wherein the attachment arm transmits an electrical charge to the one or more power storage units in the base.

5. The solar powered charging device of claim 1 wherein the attachment arm has at least one point of articulation.

6. The solar powered charging device of claim 1 wherein the one or more charging means is a cord for use with an electrically powered device.

7. The charging device of claim 6 wherein the electrically powered device is a cellular phone, smart phone, portable camera, video game, computer or music providing device.

8. The solar powered charging device of claim 1 wherein the shade structure is aligned with the base to block sunlight from reaching the base.

9. The solar powered charging device of claim 1 wherein the shade structure has one or more lights on its top surface.

10. The solar powered charging device of claim 1 wherein the shade structure has one or more lights on its bottom surface.

11. The solar powered charging device of claim 1 wherein the base or attachment arm has one or more lights.

12. The solar powered charging device of claim 1 wherein the shade structure has a display means on its top surface.

13. The solar powered charging device of claim 1 wherein the base includes a container for storage.

14. The solar powered charging device of claim 1 wherein the one or more power storage units is located in the base.

15. The solar powered charging device of claim 1 wherein the one or more power storage units is located in the shade structure or attachment arm.

16. The solar powered charging device of claim 1 wherein the one or more charging means is located in the base or attachment arm.

17. The solar powered charging device of claim 1 wherein the base or shade structure includes speakers and the base includes a means for using AC power.

18. A solar powered charging device designed to fit on the top surface of a table comprising:
- a shade structure having one or more solar cells contained on an outer surface of the shade structure;
- a base for supporting the solar powered charging device;
- an attachment arm which extends between the base and the shade structure and has a detachable coupling device to allow the interchange of shade structures or bases, wherein the detachable coupling device forms an electrical connection and comprises a detachable male portion and female portion;
- one or more power storage units connected to the one or more solar cells to store electrical energy; and
- one or more charging means connected to the one or more power storage units to charge one or more devices having a renewable battery.

19. The solar powered charging device of claim 18 wherein the attachment arm transmits an electrical charge to the one or more power storage units in the base and has at least one point of articulation.

20. The solar powered charging device of claim 18 wherein the one or more charging means is a cord for use with an electrically powered device.

21. The solar powered charging device of claim 18 wherein the shade structure has one or more lights on its top surface, base and/or attachment arm.

22. The solar powered charging device of claim 18 wherein the shade structure has a display means on its top surface.

23. The solar powered charging device of claim 18 wherein the base includes a container for storage.

24. The solar powered charging device of claim 18 wherein the one or more power storage units is located in the base, shade structure or attachment arm and the one or more charging means is located in the base or attachment arm.

* * * * *